US012337433B2

(12) United States Patent
Long et al.

(10) Patent No.: US 12,337,433 B2
(45) Date of Patent: Jun. 24, 2025

(54) ASSEMBLING EQUIPMENT

(71) Applicant: Fulian Yuzhan Precision Technology Co., Ltd., Shenzhen (CN)

(72) Inventors: Bo Long, Shenzhen (CN); Xiao-Ming Xu, Shenzhen (CN); Zhen-Xing Liu, Shenzhen (CN); Chun-Ming Zhang, Shenzhen (CN)

(73) Assignee: Fulian Yuzhan Precision Technology Co., Ltd., Shenzhen (CN)

( * ) Notice: Subject to any disclaimer, the term of this patent is extended or adjusted under 35 U.S.C. 154(b) by 247 days.

(21) Appl. No.: 18/115,631

(22) Filed: Feb. 28, 2023

(65) Prior Publication Data

US 2023/0271287 A1 Aug. 31, 2023

(30) Foreign Application Priority Data

Feb. 28, 2022 (CN) .......................... 202210190086.3

(51) Int. Cl.
*B23Q 3/16* (2006.01)
*B23Q 3/06* (2006.01)
*B23Q 7/02* (2006.01)
*B23Q 7/14* (2006.01)
*B23Q 7/18* (2006.01)
*B23Q 17/24* (2006.01)

(52) U.S. Cl.
CPC .................. *B23Q 7/02* (2013.01); *B23Q 3/06* (2013.01); *B23Q 3/16* (2013.01); *B23Q 7/1405* (2013.01); *B23Q 7/1478* (2013.01); *B23Q 7/18* (2013.01); *B23Q 17/2409* (2013.01); *B23Q 2220/004* (2013.01); *B23Q 2703/02* (2013.01)

(58) Field of Classification Search
CPC ... B23Q 3/03; B23Q 3/16; B23Q 7/02; B23Q 7/1405; B23Q 7/1478; B23Q 7/18; B23Q 2703/02
USPC ............................................... 198/345.1, 346
See application file for complete search history.

(56) References Cited

U.S. PATENT DOCUMENTS 9,956,622 B2 * 5/2018 Heidlmayer ........... B23Q 3/088
10,180,070 B2 * 1/2019 Chauvin ................. F01D 5/147
(Continued)

OTHER PUBLICATIONS

US 2012/0325275 A1, Goodman et al., Dec. 27 (Year: 2012).*
(Continued)

*Primary Examiner* — Douglas A Hess
(74) *Attorney, Agent, or Firm* — ScienBiziP, P.C.

(57) ABSTRACT

An assembling equipment for performing asynchronous process on a first workpiece and a second workpiece. The assembling equipment includes a base and a conveying mechanism on the base. The conveying mechanism transports a first positioning assembly carrying a first workpiece and a second positioning assembly carrying a second workpiece to a first station synchronously, and a first attaching mechanism attaches a first component to the first workpiece at the first station. Then the conveying mechanism transports the first positioning assembly and the second positioning assembly to a second station synchronously, a second attaching mechanism attaches a second component to the second workpiece, and a first processing mechanism processes first workpiece that has been attached with the first component according to a preset requirement at the same time. The assembling equipment improves efficiency of production.

18 Claims, 13 Drawing Sheets

(56) References Cited

U.S. PATENT DOCUMENTS 10,470,853 B2* 11/2019 Leeson .................. B23Q 3/061
11,305,396 B2* 4/2022 Schorn ..................... B24B 7/06

OTHER PUBLICATIONS

US 2017/0292584 A1, Kawata et al., Oct. 12 (Year: 2017).*
US 2019/0247968 A1, Tsukamoto et al., Aug. 15 (Year: 2019).*
US 2023/0014205 A1, Kim et al., Jan. 19 (Year: 2023).*
US 2023/0271287 A1, Long et al., Aug. 31 (Year: 2023).*
US 2023/0381866 A1, Harnickell et al., Nov. 30 (Year: 2024).*
US 2024/0165758 A1, Park et al., May 23 (Year: 2024).*

* cited by examiner

ASSEMBLING EQUIPMENT

CROSS-REFERENCE TO RELATED APPLICATION

This application claims priority to China Application No. 202210190086.3, having a filing date of Feb. 28, 2022, filed in China State Intellectual Property Administration, the entire contents of which are hereby incorporate by reference.

FIELD

The subject matter relates to the field of assembling technologies, and more particularly, relates to an assembling equipment.

BACKGROUND

When attaching a component with a small size on a predetermined area of a workpiece, assembling manually is usually applied. The manual operation is difficult, labor intensive, and costly, while the efficiency is generally low, and the consistency poor, resulting in product of low quality.

Therefore, there is room for improvement within the art.

SUMMARY

The present disclosure is characterized by providing an assembling equipment, the assembling equipment includes a base, a conveying mechanism, a first attaching mechanism, a second attaching mechanism, and a first processing mechanism. The base includes a first station and a second station, the conveying mechanism is arranged on the base, a first positioning assembly and a second positioning assembly are arranged on the conveying mechanism, the first positioning assembly is configured for positioning a first workpiece, and the second positioning assembly is configured for positioning a second workpiece, the conveying mechanism is configured to move the first positioning assembly and the second positioning assembly synchronously to the first station and move the first positioning assembly and the second positioning assembly synchronously from the first station to the second station. The first attaching mechanism is arranged at the first station, the first attaching mechanism is configured for picking up and attaching a first component to the first workpiece carried by the first positioning assembly after the first positioning assembly and the second positioning assembly being moved to the first station. The second attaching mechanism is arranged at the second station, the second attaching mechanism is configured for picking up and attaching a second component to the second workpiece carried by the second positioning assembly after the first positioning assembly and the second positioning assembly being moved from the first station to the second station. The processing mechanism is arranged at the second station, the processing mechanism is configured for processing the first workpiece that has been attached to the first component.

BRIEF DESCRIPTION OF THE DRAWINGS

Implementations of the present technology will now be described, by way of example only, with reference to the attached figures.

DETAILED DESCRIPTION

Figure 1:
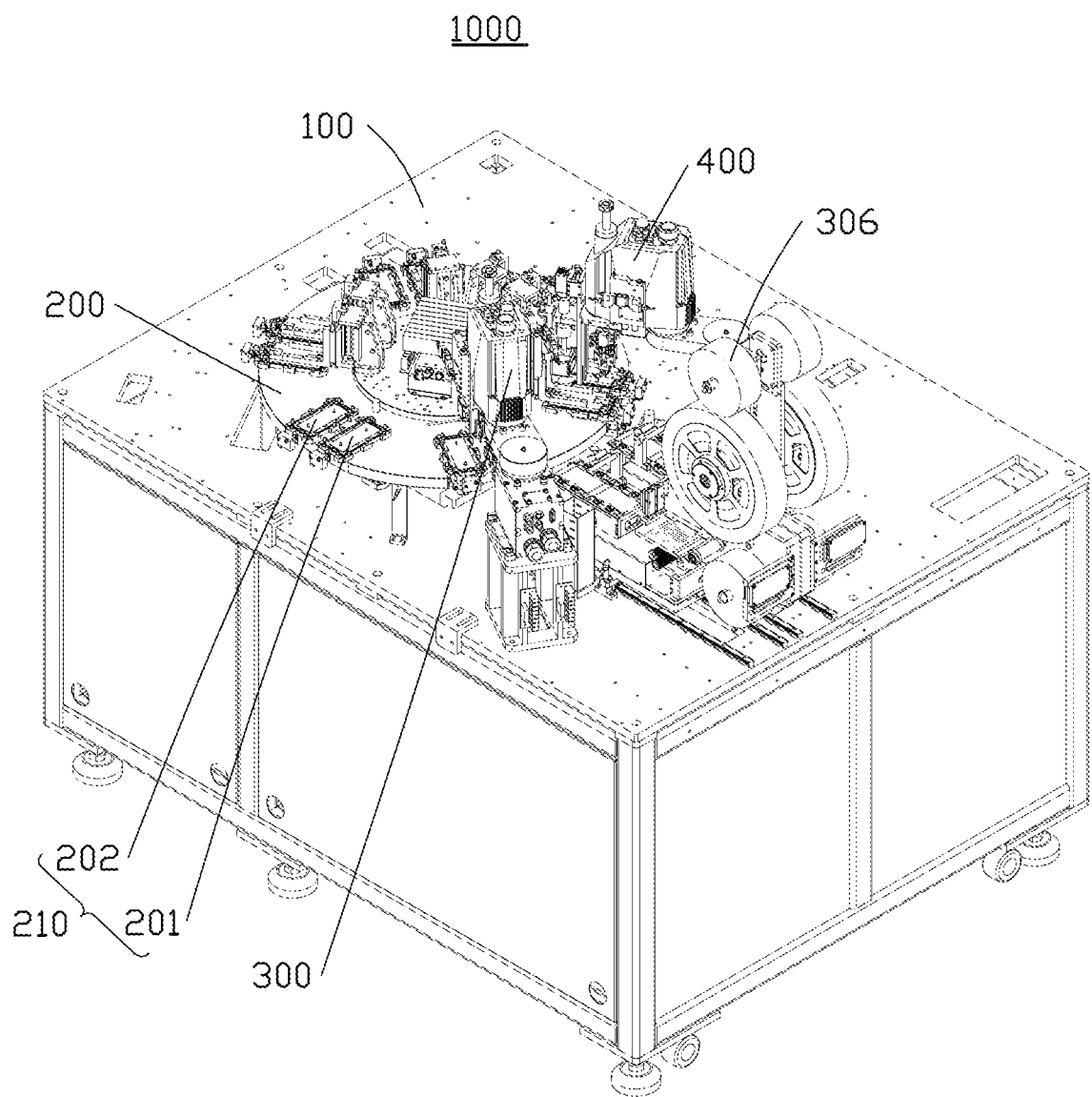
FIG. 1 is a perspective view of an assembling equipment according to an embodiment of the present disclosure.

It will be appreciated that for simplicity and clarity of illustration, where appropriate, reference numerals have been repeated among the different figures to indicate corresponding or analogous components. The description is not to be considered as limiting the scope of the embodiments described herein. The drawings are not necessarily to scale and the proportions of certain parts may be exaggerated to better illustrate details and features of the present disclosure.

A description of the hereinafter described embodiments of the disclosure is presented herein with reference to the figures by way of exemplification and not as a limitation.

An assembling equipment is provided for reducing manual labor intensity and high labor cost, while improving efficiency and product quality.

Referring to FIGS. 1-4, an assembling equipment 1000 is provided, the assembling equipment includes a base 100, a conveying mechanism 200, a first attaching mechanism 300, a second attaching mechanism 400, and a processing mechanism 500. Specifically, the base 100 includes a first station and a second station, the conveying mechanism 200 is mounted on the base 100, a pair of positioning assemblies 210 is arranged on the conveying mechanism 200 for being moved to a first station or being moved from the first station to a second station, the pair of positioning assemblies 210 is shown as a first positioning assembly 201 and a second positioning assembly 202 in FIG. 1. The first positioning assembly 201 is configured for positioning and carrying a first workpiece and the second positioning assembly 202 is configured for positioning and carrying a second workpiece. The first attaching mechanism 300 is arranged at the first station, the second attaching mechanism 400 and the processing mechanism 500 are arranged at the second station. When the pair of positioning assemblies 210 arrived at the first station, the first attaching mechanism 300 is configured for picking up a first component and attaching the first component to the first workpiece carried by the first positioning assembly 201; when the pair of positioning assemblies 210 arrived at the second station, the second attaching mechanism 400 is configured for picking up a second component and attaching the second component to the second workpiece carried by the second positioning assembly 202, and the processing mechanism 500 is configured for processing the first workpiece that has been attached with the first component according to a first preset requirement. For the sake of illustration, the processing mechanism 500 here is described as the first processing mechanism 500.

In this embodiment, by moving the first positioning assembly 201 and the second positioning assembly 202 synchronously, the assembly equipment 1000 can transfer two workpieces between different stations at one time, which improves efficiency of production.

Further, the first attaching mechanism 300 attaches the first component to the first workpiece at the first station, the second attaching mechanism 400 attaches the second component to t the second workpiece at the second station, realizing an automatic attaching process, avoiding manual operation, and reducing manual labor intensity and labor costs. In addition, the automatic attaching process eliminates poor consistency due to manual operation, improves the product quality, and facilities production in large batches.

The process of attaching first component to the first workpiece and the process of attaching the second component to the second workpiece are performed at different stations, allowing the first attaching mechanism 300 and the second attaching mechanism 400 to be installed at different stations. Such arrangement is suitable for use especially with application scenarios of miniaturized assembling system, as two attaching mechanisms (such as the first attaching mechanism 300 and the second attaching mechanism 400) arranged at the same station may interfere with each other when operating at the same time. For example, a manipulator can be used as an attaching mechanism, and multiple sensors and/or other precision structures are arranged on an end effector of the manipulator for precise positioning. These sensors and/or precision structures take a large space in the miniaturized assembling system (such as a turnplate-type base in FIG. 1), if two manipulators operate parallelly at one station, they are easily to interfere with each other. Therefore, it is hard to balance efficiency, precise, and automation for each mechanism (such as the first attaching mechanism, the second attaching mechanism, the first processing mechanism, the conveying mechanism, and the feeding mechanism). However, by staggering mechanisms with large size and performing different processes at different stations, efficiency, precise, and automation of each mechanism can be balanced. For example, in this embodiment, the first attaching mechanism and the second mechanism are arranged at different stations for asynchronously machining the first workpiece and the second workpiece.

It should be noted that, in this embodiment, one pair of positioning assemblies 210 (one first positioning assembly 201 and one second positioning assembly 202) is arranged, in further embodiment, more or fewer pair of positioning assemblies 210 can be arranged, and the number of the pair of positioning assemblies 210 is not limited. Each pair of positioning assemblies 210 can be moved to the same one station (such as the first station or the second station) synchronously. For example, two pair of positioning assemblies 210 are arranged, in operation, when one pair of positioning assemblies 210 is moved to the second station, the other pair of positioning assemblies 210 will be moved to the first station, and the first attaching mechanism 300 can process the attaching process on the first workpiece carried by the first position assembly 201 of the one pair of positioning assemblies 210, and the second attaching mechanism 400 can process the attaching process on the second workpiece on the second position assembly 202 of the other pair of positioning assemblies 210 at the same time. Therefore, in this embodiment, the first attaching mechanism 300 and the second attaching mechanism 400 in the miniaturized assembling system can operate synchronously without interfering with each other, that is, the first attaching mechanism 300 and the second attaching mechanism 400 can respectively attach a component to a workpiece at different stations at the same time, which improves the production efficiency. Further, the conveying mechanism 200 can transfer multiple pairs of positioning assemblies 210 at the same time, each pair of positioning assemblies 210 can be move to different stations for processing, which reduces production cost and saves energy.

According to further embodiments, when the first positioning assembly 201 and the second positioning assembly 202 arrived the second station, the first workpiece, which has been attached with the first component at the first station, can be processed by the first processing mechanism 500 at the second station, and the second attaching mechanism 400 at the second station can attach the second component to the second workpiece at the same time. Therefore, the first processing mechanism 500 and the second attaching mechanism 400 can operate synchronously, avoiding the first workpiece or the second workpiece being in waiting and enhancing the production efficiency.

It should be noted that, the name of the first station and the second station are used to distinguish between stations and are not used to denote a particular order or imply a number of the stations. According to further embodiments, more or fewer stations can be provided. For example, in further embodiments, the assembling equipment 1000 has four stations, and to facilitate the description, the four stations are named as first station, second station, third station, and fourth station.

Figure 2:
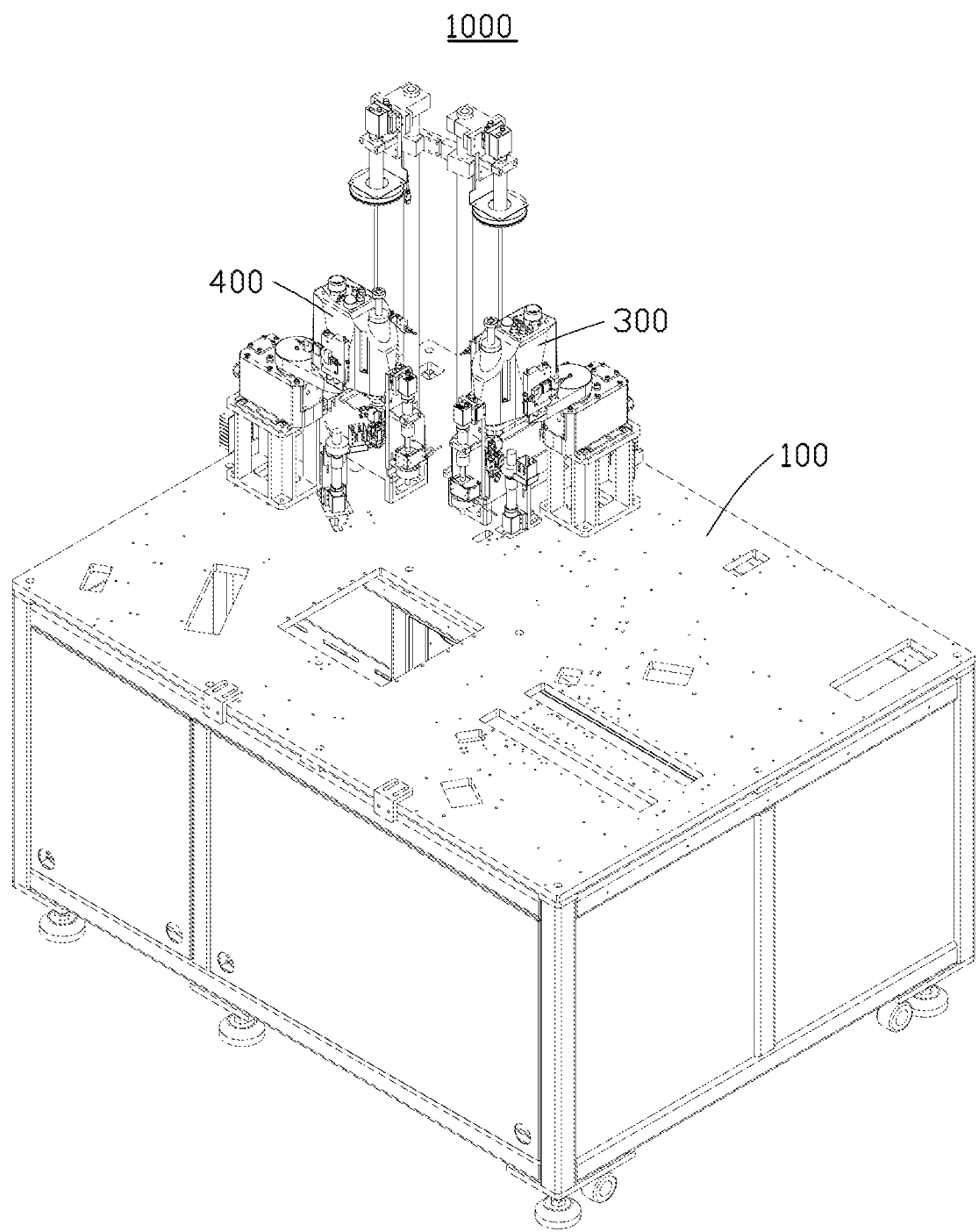
FIG. 2 is another perspective view of the assembling equipment in FIG. 1 with some mechanisms omitted.

In the assembling equipment 1000 including four stations, two first attaching mechanisms 300 are arranged at the first station and the third station respectively, two first processing mechanisms 500 are arranged at the second station and the fourth station respectively. In operation, for the first workpiece, the first positioning assembly 201 and the second positioning assembly 202 are moved to the first station, the first attaching mechanism 300 at the first station (as shown in FIG. 1) can attach the first component to the first workpiece carried by the first position assembly 201, then the first positioning assembly 201 and the second positioning assembly 202 are moved to the second station, the first processing mechanism 500 at the second station processes the first workpiece that has been attached with the first component according to the first preset requirement. Then the first positioning assembly 201 and the second positioning assembly 202 are moved to the third station, the first attaching mechanism 300 (as shown in FIG. 2) arranged at the third station attaches another first component to the first workpiece that has been processed according to the first preset requirement. After that, the first positioning assembly 201 and the second positioning assembly 202 are moved to the fourth station, the first processing mechanism 500 arranged at the fourth station processes the first workpiece that has been attached with the first component according to a second preset requirement.

It should be noted that, the first component being attached to the first workpiece at the first station and the first component being attached to the first workpiece at the third station can be the same or different; the first preset requirement and the second preset requirement can be the same or different. For example, the first component being attached to the first workpiece at the first station may include a glue layer and a film, the glue layer may be adhesive; the first preset requirement may be the first processing mechanism 500 at the second station removing the film for the first workpiece; the first component being attached to the first workpiece at the third station may be an accessory, and the first attaching mechanism 300 at the third station adhere the accessory to the first workpiece by the adhesive; the second preset requirement may be the first processing mechanism 500 at the fourth station pressing the accessory against the first workpiece for a predetermined time duration.

Figure 3:
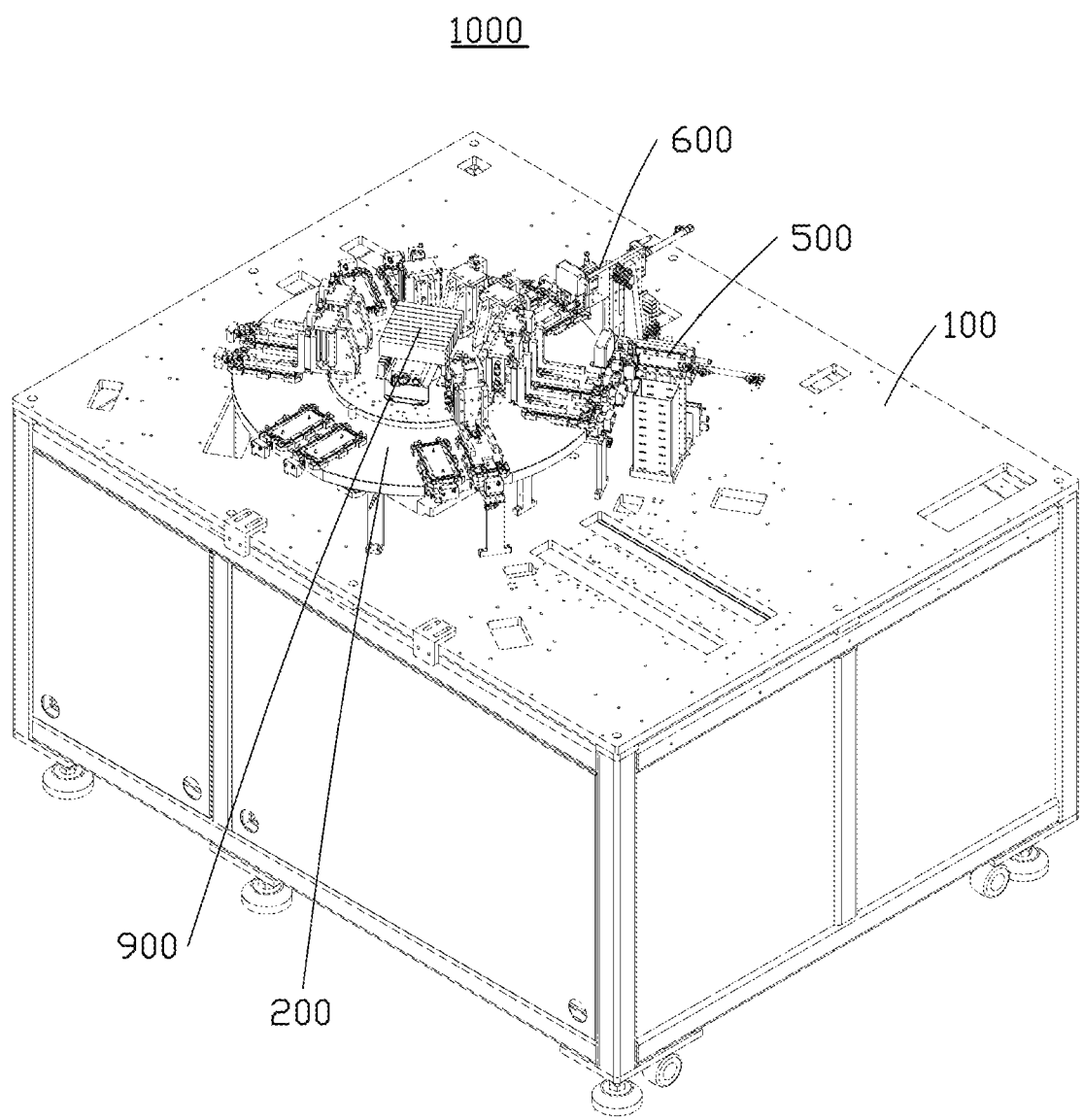
FIG. 3 is another perspective view of the assembling equipment in FIG. 1 with some mechanisms omitted.

According to further embodiments, in addition to the second attaching mechanism 400 arranged at the second station, the assembling equipment 1000 further includes a second processing mechanism 600 (as shown in FIG. 3) arranged at the third station. In operation, for the second workpiece, the first positioning assembly 201 and the second positioning assembly 202 are moved from the first station to the second station, the second attaching mechanism 400 at the second station can attach the second component to the second workpiece carried by the second position assembly 202, then the first positioning assembly 201 and the second positioning assembly 202 are moved to the third station, the second processing mechanism 600 at the third station processes the second workpiece that has been attached with the second component according to a third preset requirement. Therefore, at the second station, the first processing mechanism 500 and the second attaching mechanism 400 can perform different processes on the first workpiece and the second workpiece at the same time; at the third station, the first attaching mechanism 300 and the second processing mechanism 600 can perform different processes on the first workpiece and the second workpiece at the same time; thus different procedures are performed on the first workpiece and the second workpiece at the same time. Such asynchronous operation allows different procedures being performed on two workpieces at the same time and the same station, provides a reasonable layout of the assembling equipment 1000 avoiding interfere between the mechanisms, and improves the production efficiency.

It should be noted that, the second component being attached on the second workpiece by the second attaching mechanism 400 at the second station is not limited here, and the processing preformed at the third station by the second processing mechanism 600 on the second workpiece that has been attached with the second component is not limited here. For example, the second component may include a glue layer and a film, the glue layer may be adhesive; the third preset requirement may be the second processing mechanism 600 at the third station removing the film for the second workpiece. Alternatively, the second component being attached to the second workpiece at the second station may be an accessory, and the third preset requirement may be the second processing mechanism 600 at the third station presses the accessory against the second workpiece for a predetermined time duration.

It should be noted that, in further embodiments, the assembling equipment 1000 further includes a second attaching mechanisms 400 arranged at the fourth station. When the first positioning assembly 201 and the second positioning assembly 202 arrived at the second station, the second attaching mechanism 400 (as shown in FIG. 1) at the second station attaches the second component to the second workpiece. The second processing mechanism 600 at the third station processes the second workpiece that has been attached with the second component according to the third preset requirement. After that, the first positioning assembly 201 and the second positioning assembly 202 move to the fourth station, and the second attaching mechanism 400 (as shown in FIG. 2) at the fourth station can attach another second component to the second workpiece that had been processed.

Figure 4:
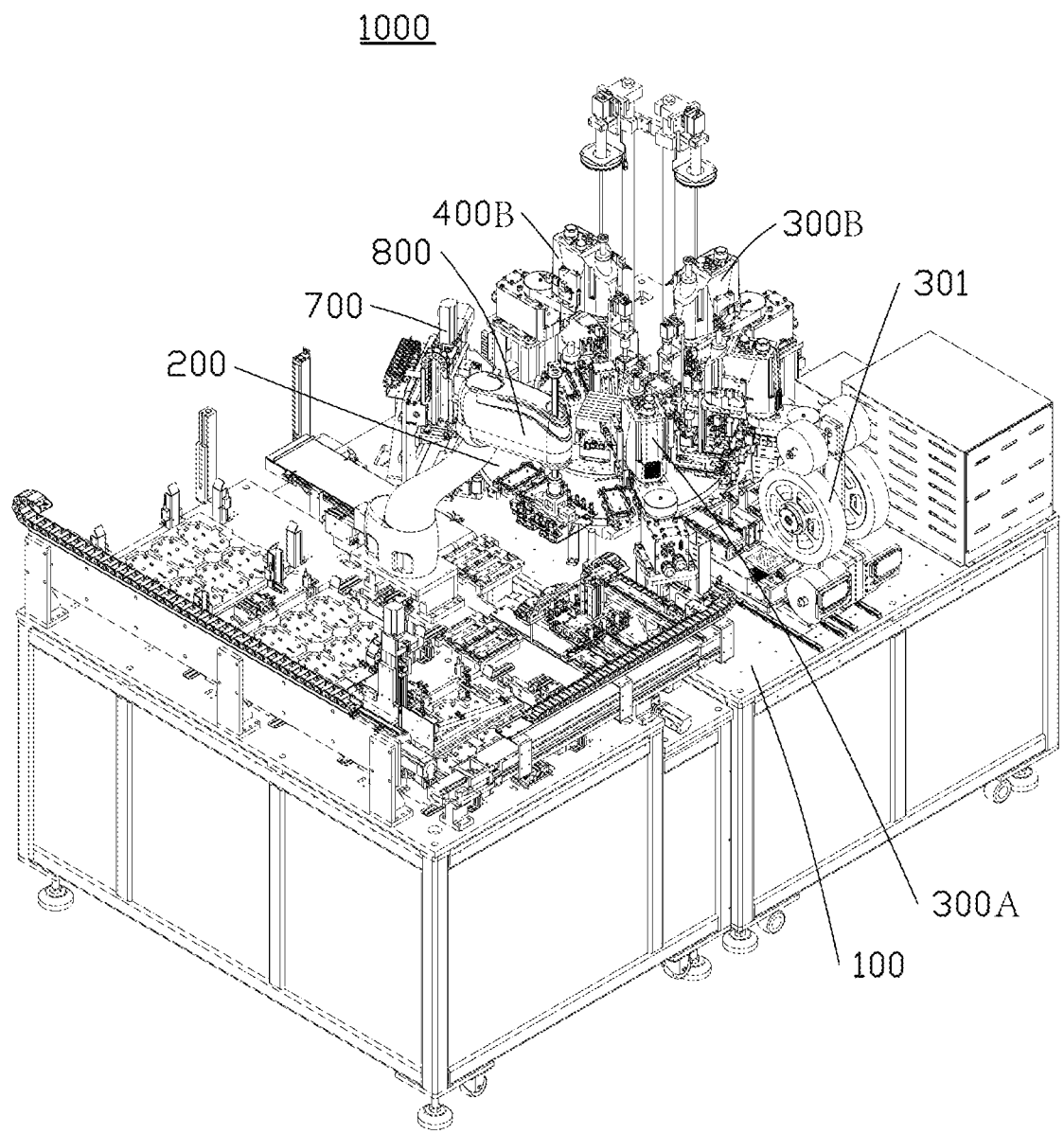
FIG. 4 is a perspective view from another view of the assembling equipment in FIG. 1.
Figure 5:
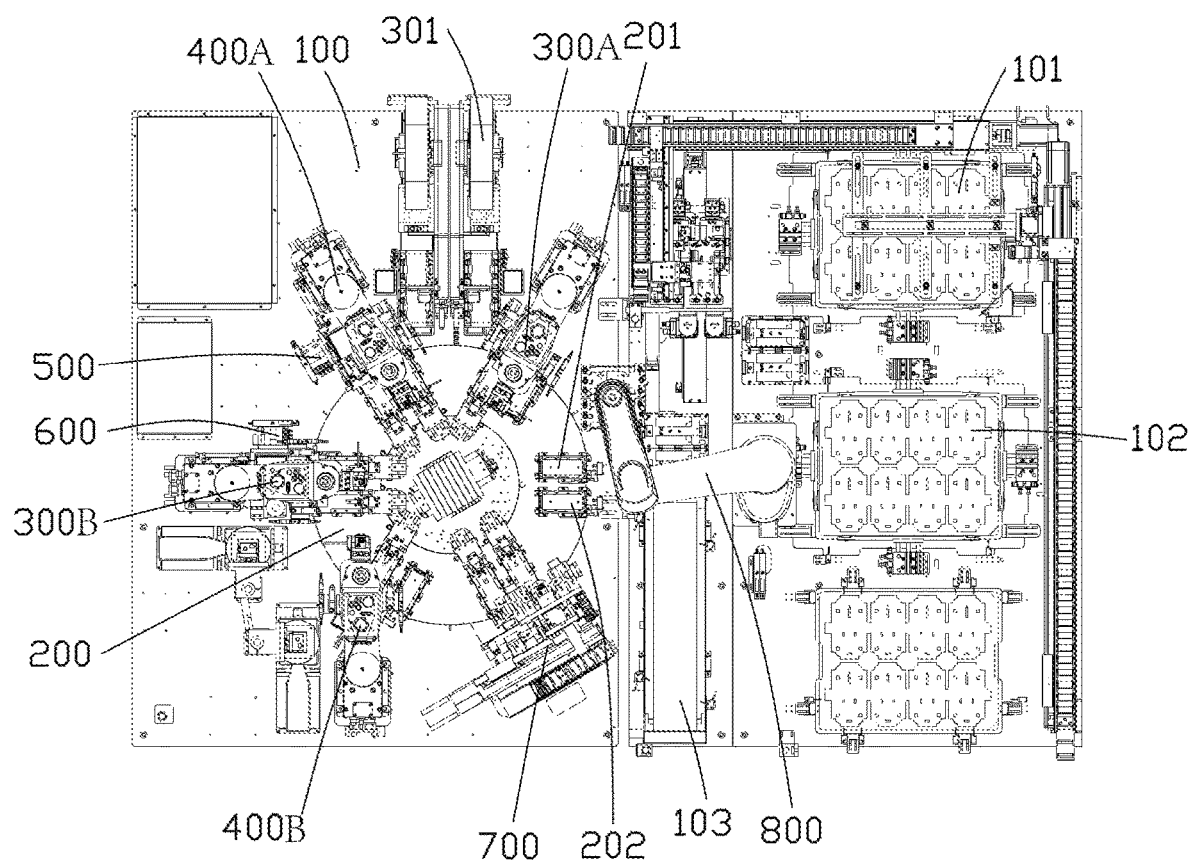
FIG. 5 is a topside view of FIG. 4.
Figure 6:
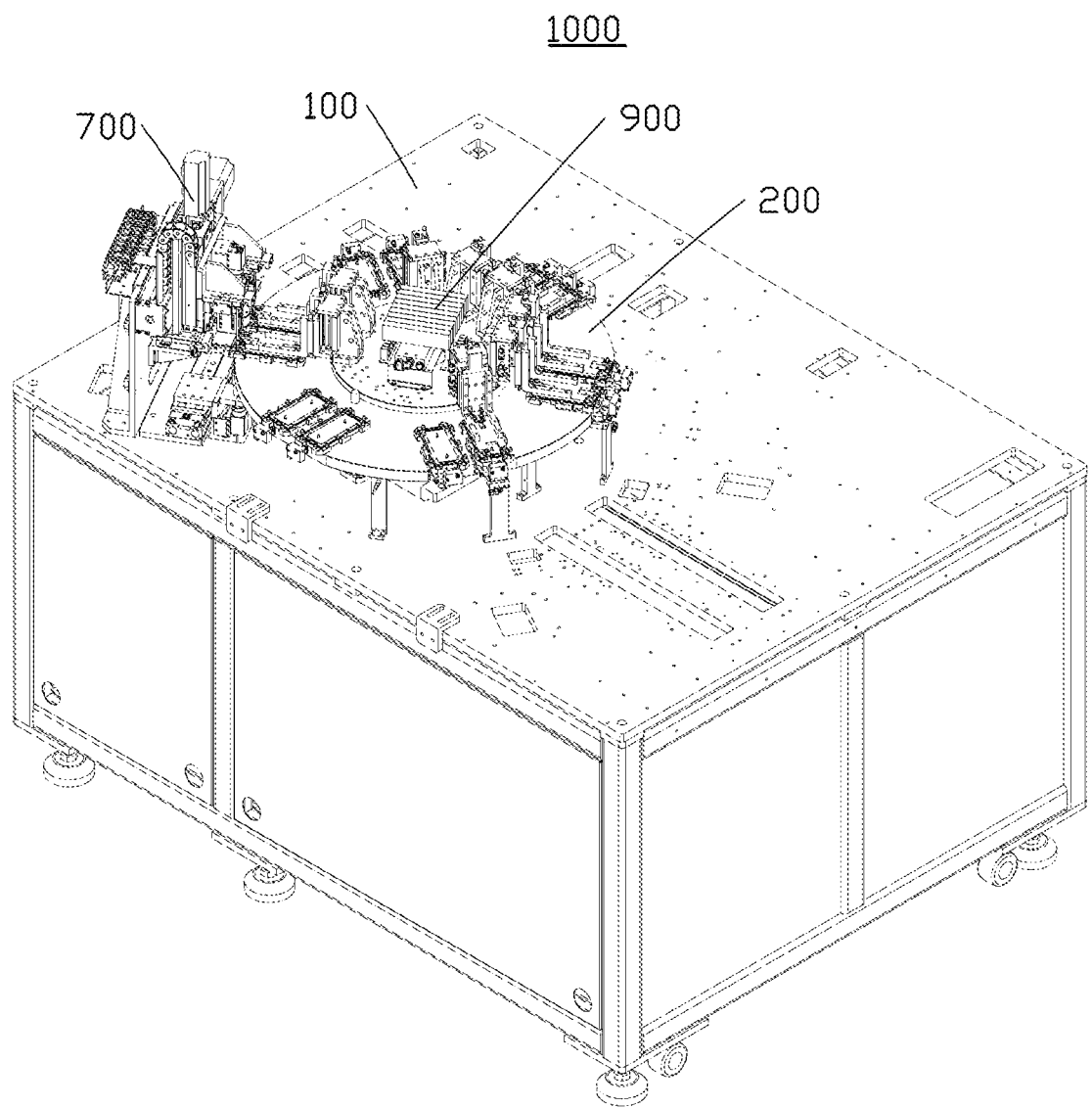
FIG. 6 is a perspective view of a third processing mechanism arranged on a base.

According to some embodiments, referring to FIG. 4 and FIG. 5, the assembling equipment 1000 includes five stations: a first station, a second station, a third station, a fourth station, and a fifth station. A first attaching mechanism 300A is arranged at the first station, and a first attaching mechanism 300B is arranged at the third station; a second attaching mechanism 400A is arranged at the second station, a second attaching mechanism 400B is arranged at the fourth station; a first processing mechanism 500 is arranged at the second station, a second processing mechanism 600 is arranged at the third station. The assembling equipment 1000 further includes a third processing mechanism 700 (as shown in FIG. 6) arranged at the fifth station, the third processing mechanism 700 is configured for processing the first workpiece and the second workpiece arrived at the fifth station according to a fourth preset requirement synchronously. Therefore, the asynchronous operation of the first workpiece and the second workpiece turns into a synchronous operation at the fifth station. For facilitating description, the first attaching mechanism 300 is named 300A at the first station and 300B at the third station, the second attaching mechanism 400 is named 400A at the second station and 400B at the fourth station. According to actual requirement, the first attaching mechanism 300A and the first attaching mechanism 300B can be the same or not, the second attaching mechanism 400A and the second attaching mechanism 400B can be the same or not. The first attaching mechanism 300A is configured for attaching the first component to the first workpiece, the first attaching mechanism 300B is configured for attaching the first accessory to the first workpiece by the adhesive of the first component (the film of the first component has been removed at the second station by the first processing mechanism 500), the second attaching mechanism 400A is configured for attaching the second component to the second workpiece, the second attaching mechanism 400B is configured for attaching the second accessory to the second workpiece by the adhesive of the second component (the film of the second component has been removed at the third station by the second processing mechanism 600).

In operation, the conveying mechanism 200 drives the first positioning assembly 201 and the second positioning assembly 202 to the first station synchronously, and the first attaching mechanism 300A attaches the first component to the first workpiece, for example, the first component includes a glue layer and a film. Then the conveying mechanism 200 drives the first positioning assembly 201 and the second positioning assembly 202 to the second station, the first processing mechanism 500 processes the first workpiece (the first workpiece here has been attached with the first component) according to the first preset requirement, such as removing the film of the first component, meanwhile, the second attaching mechanism 300A attaches the second component to the second workpiece, for example, the second component includes a glue layer and a film. After that, the conveying mechanism 200 drives the first positioning assembly 201 and the second positioning assembly 202 to the third station, the first attaching mechanism 300B attaches the first accessory to the first workpiece (the first workpiece here has been processed, the first accessory can be attached to the first workpiece such as through the glue layer of the first component), and the second processing mechanism 600 processes the second workpiece according to the second preset requirement(the second workpiece here has been attached with the second component), such as removing the film of the second component for the second workpiece.

After that, the conveying mechanism 200 drives the first positioning assembly 201 and the second positioning assembly 202 to the fourth station together, the second attaching mechanism 400B attaches the second accessory to the second workpiece. That is, the second workpiece here has been processed, the second accessory can be attached to the second workpiece such as through the glue layer of the second component. Then the conveying mechanism 200 drives the first positioning assembly 201 and the second positioning assembly 202 to the fifth station together, the third processing mechanism 700 processes the first workpiece and the second workpiece together. That is, the first workpiece here has been attached with the first accessory, and the second workpiece here has been attached with the second accessory) according to the fourth preset requirement, such as pressing the first accessory and the second accessory against the first workpiece and the second workpiece respectively for a certain time duration. The third processing mechanism 700 includes a pressure retaining device that can press the first workpiece and the second workpiece at the same time. Further, an unloading clamp 203 is provided, the unloading clamp 203 can pick up the first workpiece and the second workpiece at the same time.

Figure 7:
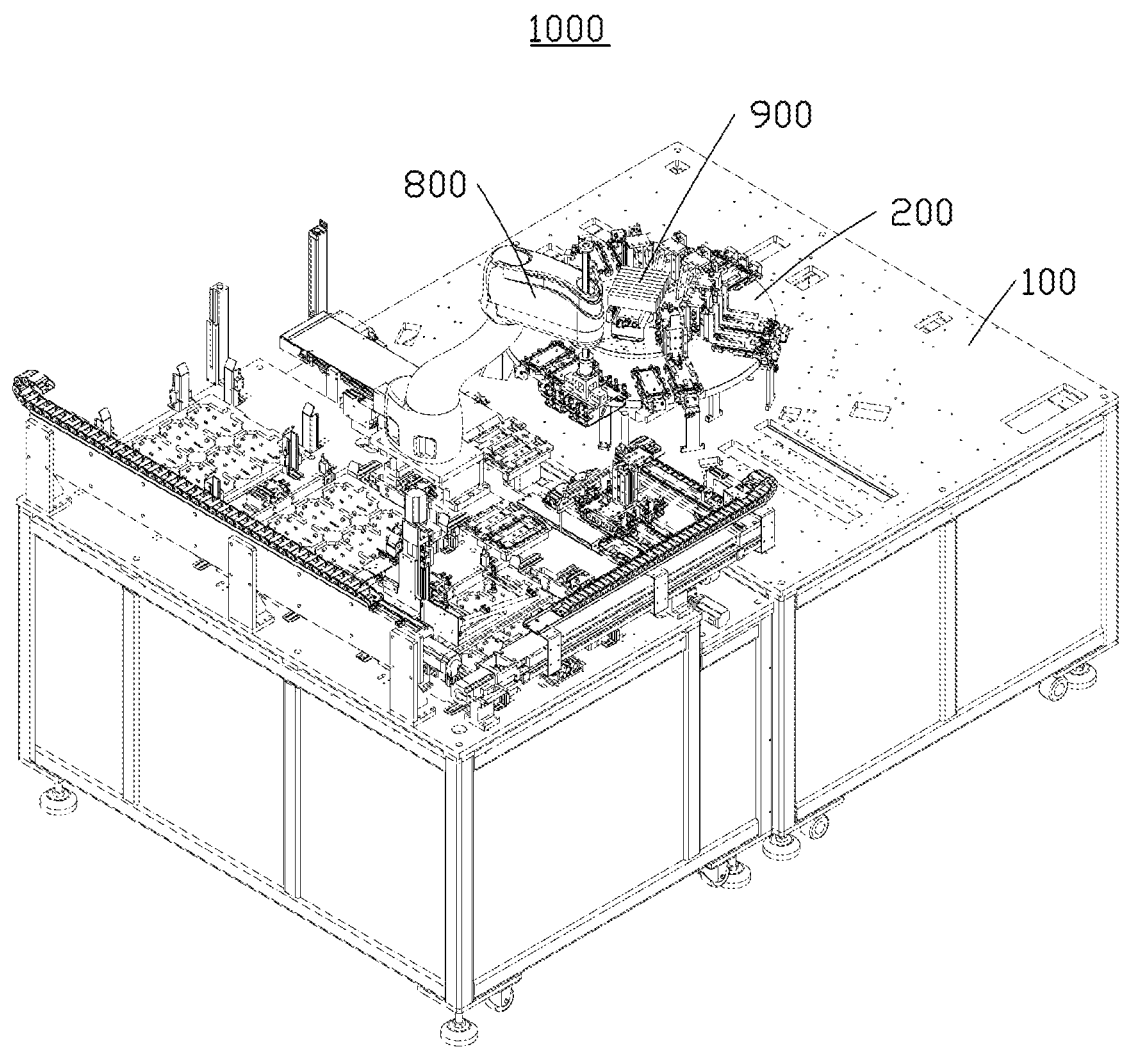
FIG. 7 is a perspective view of a loading and unloading device arranged on the base.

Referring to FIG. 7, according to further embodiments, the assembling equipment 1000 further includes a sixth station and a loading and unloading device 800 arranged at the sixth station, the loading and unloading device 800 is configured for picking up the first workpiece from the first positioning assembly 201 and picking up the second workpiece from the second positioning assembly 202 (the first workpiece and the second workpiece here has been processed according to the fourth preset requirement). According to further embodiments, the loading and unloading device 800 is further configured for placing the first workpiece on the first positioning assembly 201 and placing the second workpiece on the second positioning assembly 202 respectively (the first workpiece here has not been attached with the first component or the first accessory yet, and the second workpiece here has not been attached with the second component or the second accessory yet).

According to some embodiments, referring to FIG. 5, the base 100 is arranged with a loading station 101, an unloading station 102, and a rejecting station 103 for unloading disqualified product. The loading station 101 is configured for receiving the first workpiece has not been attached with the first component yet and the second workpiece has not been attached with the second component yet, the unloading station 102 is configured for receiving a qualified first workpiece that has been attached with the first component and a qualified second workpiece that has been attached with the second component, the rejecting station 103 is configured for receiving a disqualified first workpiece that has been attached with the first component and a disqualified second workpiece that has been attached with the second component. In this embodiment, the loading and unloading device 800 is configured for picking up the first workpiece and the second workpiece from the loading station 101 and placing the first workpiece and the second workpiece on the first positioning assembly 201 and the second positioning assembly 202 respectively. The loading and unloading device 800 is further configured for picking up the qualified first workpiece that has been attached with the first component and the qualified second workpiece that has been attached with the second component from the first positioning assembly 201 and the second positioning assembly 202, and placing the first workpiece and the second workpiece on the unloading station 102 for qualified product. Further, the loading and unloading device 800 is further configured for picking up the disqualified first workpiece that has been attached with the first component and the disqualified second workpiece that has been attached with the second component from the first positioning assembly 201 and the second positioning assembly 202, and for placing the first workpiece and the second workpiece on the rejecting station 103.

Referring to FIG. 1, according to some embodiments, the conveying mechanism 200 is a rotary disc conveyor 200, the rotary disc conveyor 200 includes a rotating disc can be positioned at the first station and the second station. The first positioning assembly 201 and the second positioning assembly 202 are arranged on the rotary disc, the first attaching mechanism 300, the second attaching mechanism 400, and the first processing mechanism 500 are arranged beside the rotary disc. In operation, the rotary disc rotates to move the first positioning assembly 201 and the second positioning assembly 202 to the first station and the second station for being processed by the first attaching mechanism 300, the second attaching mechanism 400, and the first processing mechanism 500. The rotary disc conveyor 200 has a compact structure occupying a small area, and the first positioning assembly 201 and the second positioning assembly 202 can be recycled, which reduces the cost.

According to further embodiments, the conveying mechanism 200 may be a flow line conveyor 200, the flow line conveyor 200 moves the first positioning assembly 201 and the second positioning assembly 202 along the flow line to the first station and the second station for being processed by the first attaching mechanism 300, the second attaching mechanism 400, and the first processing mechanism 500 arranged beside the flow line conveyor 200. The flow line conveyor 200 moves the first positioning assembly 201 and the second positioning assembly 202 along a preset direction, which facilitates the arrangement of the assembling equipment 1000.

It should be noted that, a specific configuration of the first attaching mechanism 300 is not limited here.

Figure 8:
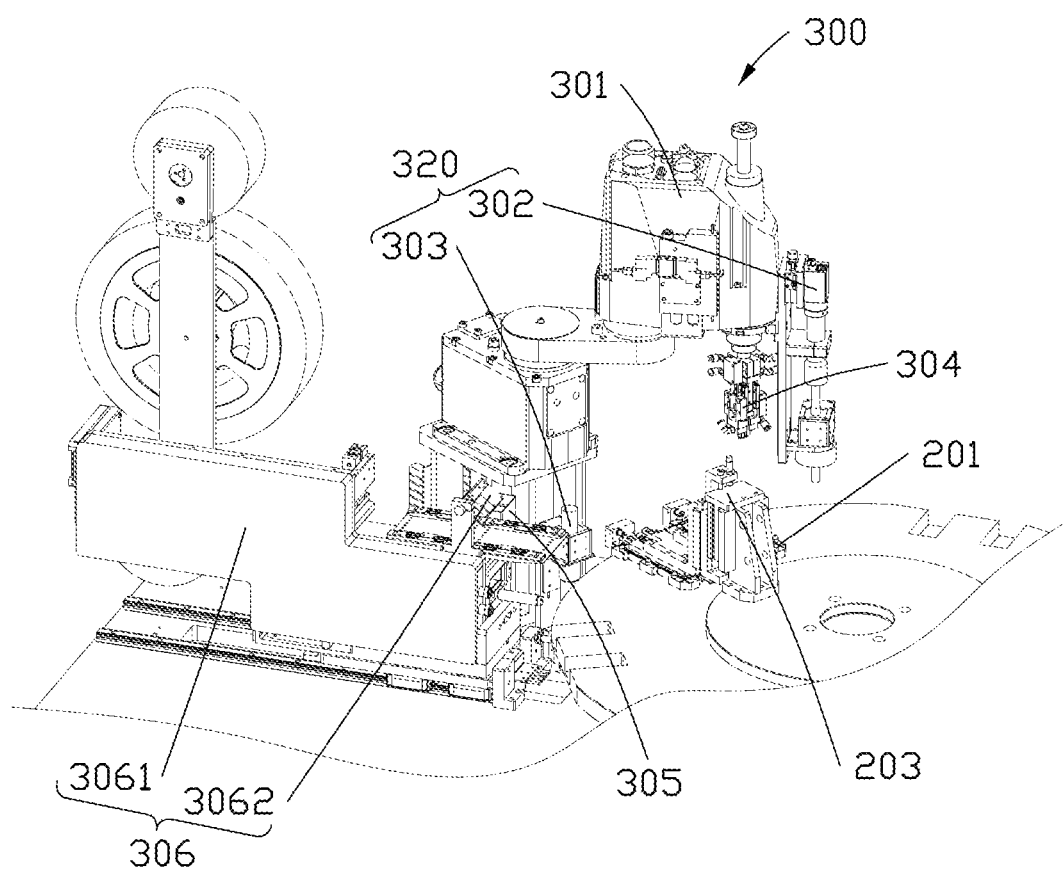
FIG. 8 is a perspective view of a first attaching mechanism in FIG. 1.

Referring to FIG. 8, according to some embodiments, the first component includes a first attaching member, the first attaching mechanism 300 includes a first transfer assembly 300 and a first detection assembly 320, the first transfer assembly 301 is configured for picking up the first attaching member and moving the first attaching member between a first position and a second position. The first transfer assembly 301 picks up the first attaching member at the first position, and the first transfer assembly 301 attaches the first attaching member to the first workpiece or removes the first attaching member from the first workpiece at the second position. The first detection assembly 320 is configured for detecting a pose of the first workpiece. The assembling equipment 1000 further includes a controller 900, the controller 900 is coupled to the first transfer assembly 301, the first detection assembly 320, and the first positioning assembly 201. The controller 900 is configured for controlling the first transfer assembly 301 to adjust the pose of the first attaching member the according to the pose detected by the first detection assembly 320, thus the first transfer assembly 301 can attach the first attaching member to the first workpiece.

Figure 9:
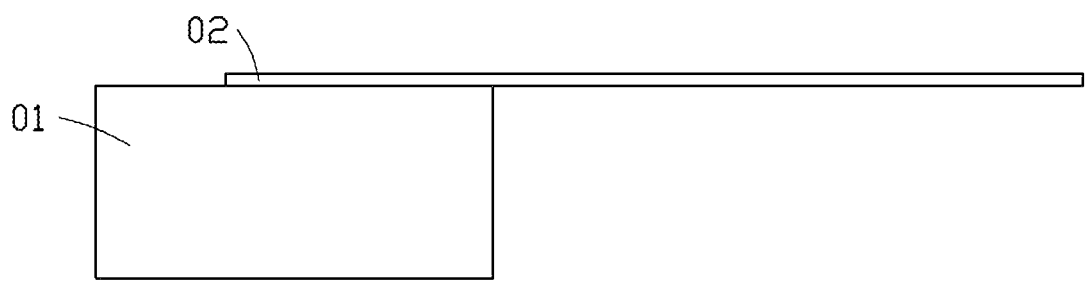
FIG. 9 shows a first workpiece that has been attached with a first attaching member.
Figure 10:
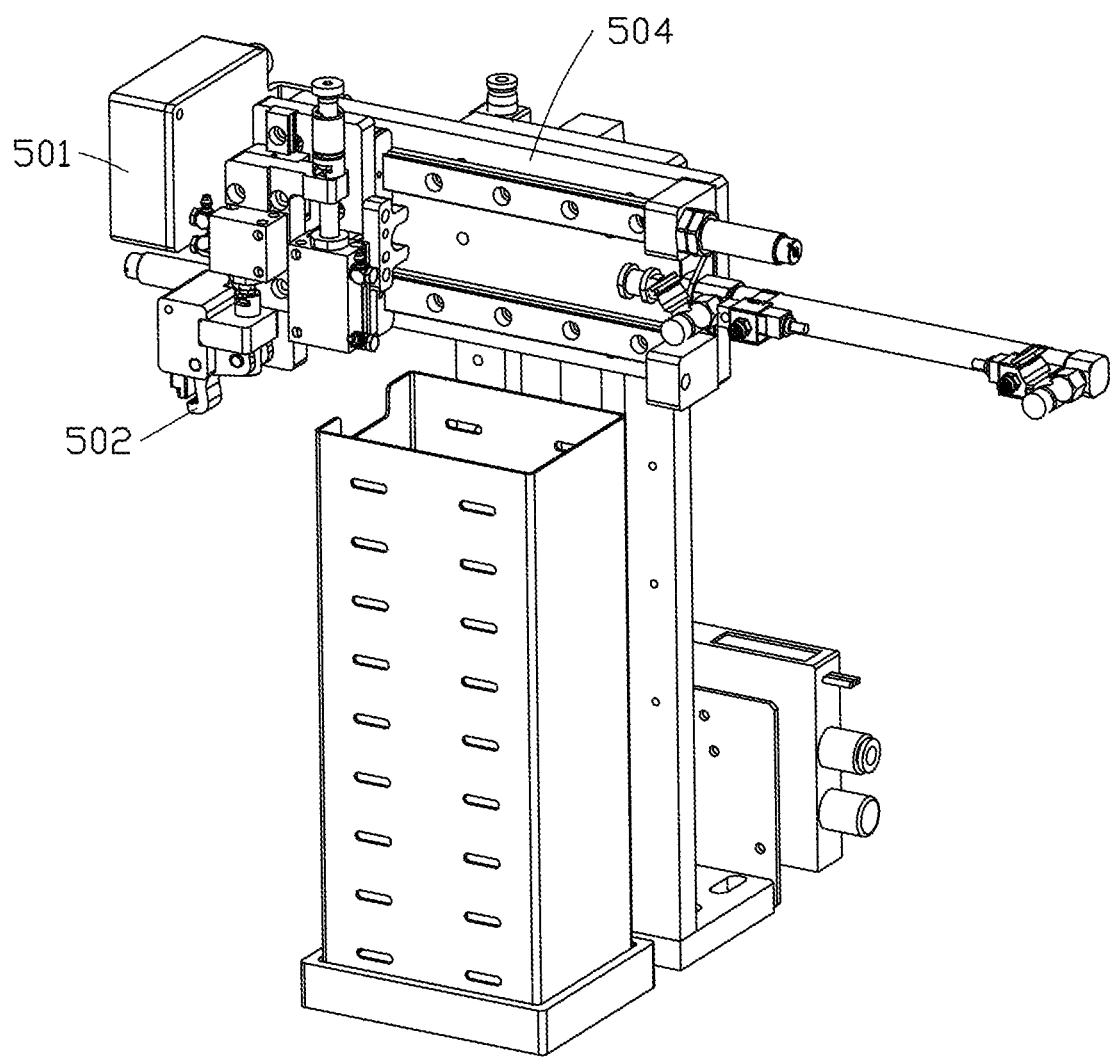
FIG. 10 shows one part of a first processing mechanism in FIG. 1.

In this embodiment, as shown in FIG. 9, the first attaching member may be a film 02 provided with the glue layer, the glue layer is arranged on one side of the film 02. The film 02 is attached to the first workpiece 01 by the glue layer. In this embodiment, the glue layer covers part of the one side of the film 02, such that the film 02 is adhered to the first workpiece 01 at the part, and the rest part of the film 02 protrudes from outer periphery of the workpiece 01.

As shown in FIG. 8, for facilitating description, the first transfer assembly 301 may be a robot arranged beside the conveying mechanism 200, the robot has an end for picking up the first attaching member. The first assembly 301 may be a multiple degrees of freedom module in further embodiments. According to some embodiments, the first transfer assembly 301 is provided with a first suction nozzle 304 for sucking the first attaching member.

According to some embodiments, the first detection assembly 320 may be a photographing device, the photographing device is configured for capturing an image of the first workpiece at the second position and acquiring the pose of the first workpiece according to the image. The pose of the first workpiece refers to a position, an angle, and a shape of the first workpiece. In this embodiment, the pose of the first workpiece refers to the position of the first workpiece, the angle of the first workpiece relative to a plane, the shape and height of the first workpiece.

Figure 12:
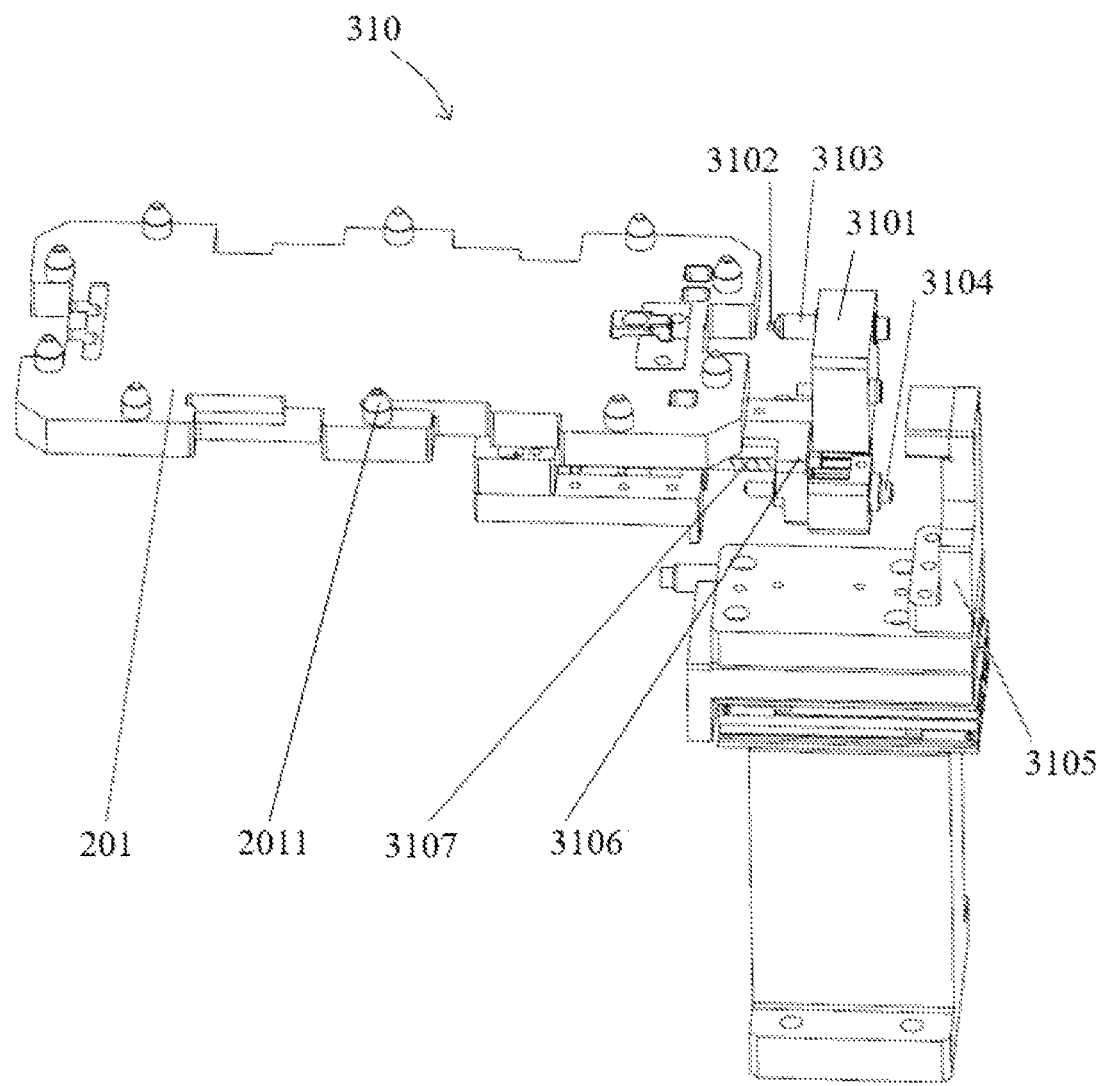
FIG. 12 is a perspective view of a lateral limit mechanism in FIG. 11.

In addition, as shown in FIG. 12, the first positioning assembly 201 is arranged with positioning pins 2011 for limiting a position of the first workpiece on the first positioning assembly 201. The first positioning assembly 201 and the positioning pins 2011 thereon can be adjusted for different first workpieces.

In operation, the first positioning assembly 201 and the second positioning assembly 202 arrived at the first station, the first detection assembly 320 detects the pose of the first workpiece and sends the pose to the controller 900, the controller 900 controls the first transfer assembly 301 to adjust the pose of the first attaching member accordingly, or the controller 900 controls the first positioning assembly 201 to adjust the pose of the first workpiece accordingly, such that the first attaching member carried by the first transfer assembly 301 can be attached to the first workpiece correctly.

It should be noted that, the first positioning assembly 201 includes a clamp 203 for holding the first workpiece, and the clamp 203 or the first positioning assembly 201 can move, rotate, or pivot the first workpiece to adjust the pose of the first workpiece until the first workpiece fits the first attaching member. Further, the clamp 203 or the first positioning assembly 201 can move towards the first attaching member to attach the first workpiece to the first attaching member.

The attaching mechanism 300 improves accuracy of attachment of the first attaching member, and the attaching process is convenient and is easy to perform.

According to some embodiments, as shown in FIG. 8, the assembling equipment 1000 includes a first feeding assembly 306, the first detection assembly 320 includes a first photographing device 302 coupled to the controller 900. The first photographing device 302 is arranged on the first transfer assembly 301, and the first photographing device 302 is configured for acquiring an image of the first attaching member at the first position. The controller 900 controls the first transfer assembly 301 to pick up the first attaching member according to the image of the first attaching member.

Specifically, as shown in FIG. 8, the first feeding assembly 306 moves the first attaching member to the first position, the first photographing device 302 acquires the image of the first attaching member at the first position and sends the image to the controller 900. The controller 900 acquires information of the accurate position, the shape, and the pose of the first attaching member based on the image, and the controller 900 determines whether the position, the shape, and the pose of the first workpiece are qualified. In cases that the first attaching member is the film having a layer of glue, the controller 900 determines whether the attaching position and the attaching surface is correct. If so, the controller 900 controls the first transfer assembly 301 to move to the first position to pick up the first attaching member.

In this embodiment, the information of the accurate position, the shape, and the pose of the first attaching member at the first position is acquired according to the image of the first attaching member at the first position, the information facilitates the first transfer assembly 301 picking up the first attaching member accurately. Further, disqualified first attaching member can be rejected before being picked by the first transfer assembly 301 by the detection.

Referring to FIG. 8, according to some embodiments, the first feeding assembly 306 includes a transporting member 3061, in this embodiment, the transporting member 3061 is a feeder configured for transporting the film to the first position. A sensor 3062 is arranged at the first position, and the sensor 3062 sends a signal to the controller 900 when the film has been moved to the first position. When receives the signal, the controller 900 controls the transporting member 3061 to stop, such that the film is positioned at the first position.

Referring to FIG. 8 and FIG. 9, according to some embodiments, the first detection assembly 320 further includes a second photographing device 303 coupled with the controller 900. The second photographing device 303 is arranged at a side of the first workpiece away from the first positioning assembly 201 and the second photographing device 303 is arranged relative to an attaching portion of the first workpiece that is to be attached with the first attaching member, that is, the second photographing device 303 is arranged above the conveying mechanism 200. The second photographing device 303 is configured for acquiring an image of the first attaching member and the attaching portion of the first workpiece at the second position. The controller 900 controls the first transfer assembly 301 to adjust the pose of the first attaching member or the first positioning assembly 201 to adjust the pose of the first workpiece according to the image.

It should be noted that, the second photographing device 303 is arranged at a side of the first workpiece away from the first positioning assembly 201 and the second photographing device 303 is arranged relative to the attaching portion of the first workpiece, that means, when the attaching portion is located at a top surface of the first workpiece, the first workpiece is held on a top surface of the first positioning assembly 201, the second photographing device 303 will be arranged at a side of the first workpiece near the attaching portion, that is, the second photographing device 303 is arranged above the conveying mechanism 200; when the attaching portion is located at a bottom surface of the first workpiece, the first workpiece is held on the top surface of the first positioning assembly 201, the second photographing device 303 will be arranged at a side of the first workpiece near the first positioning assembly 201, that is, the second photographing device 303 is arranged besides the conveying mechanism 200.

The second photographing device 303 may take pictures of the attaching portion or the first attaching member and the attaching portion from above. Specifically, the second photographing device 303 may obtain an image which includes the first attaching member and the attaching portion, and through the image of the first attaching member and the attaching portion at the second position, the relative position of the first attaching member and the attaching portion can be obtained. The image of the first attaching member and the first attaching member at the second position can be used to adjust the pose of the first attaching member or the attaching portion, such that the first attaching member is attached to an appropriate position of the attaching portion, and the attaching accuracy of the first attaching member can be improved. Alternatively, the second photographing device 303 can also be used to take pictures of the attaching portion and the first attaching member at the second position respectively, and the pose of the first attaching member or the attaching portion can be adjusted by analyzing the images of the attaching portion and the first attaching member at the second position.

The process of adjusting the pose of the first attaching member or the attaching portion includes adjusting a size of the first attaching member protrudes from the first workpiece, an angle of attaching the first attaching member to the first workpiece, and a position of attaching the first attaching member to the first workpiece.

Referring to FIG. 8, according to some embodiments, the first attaching mechanism 300 includes a first waste drum 305. After adjusting the pose of the first attaching member or the attaching portion, if the pose of the first attaching member is unmatched with the first workpiece, the first transfer assembly 301 moves the first attaching member away from the first workpiece and puts the first attaching member in the first waste drum 305.

According to further embodiments, the first component includes a film and a glue layer, the glue layer is adhered to the first workpiece, the film is adhered to the glue layer. The first preset requirement is removing the film from the glue layer, such that only the glue layer is retained on the first workpiece. The first processing mechanism 500 includes a second detection assembly 501, a suction nozzle 502, and a movable assembly 504. The second detection assembly 501 is configured for acquiring position information of the film, the position information includes height of the film or the attaching portion. The suction nozzle 502 is configured for sucking the first component on the film. The movable assembly 504 is configured for moving the suction nozzle 502 to remove the film from the first workpiece.

In operation, the second detection assembly 501 acquires the position information of the film, the position information includes the height of the film or the attaching portion. Then the second detection assembly 501 sends the position information to the controller 900, and the controller 900 controls the movable assembly 504 to move the suction nozzle 502 to the film according to the position information, such that the suction nozzle 502 can contact the film or be close enough to the film to adsorb the film by sucking. The controller controls the suction nozzle 502 to adsorb the film by sucking, and the controller controls the movable assembly 504 to move the suction nozzle 502 away from the first workpiece, the film will be removed from the glue layer of the first component as the absorption force between the suction nozzle 502 and the film is greater than the adhesive force between the film and the glue layer.

Therefore, the first processing mechanism 500 realizes an automatic film removing process, improves the efficiency of the film removing process, and reduces the labor cost of the film removing process. Further, the position information of the film is acquired before performing the film removing process, and the suction nozzle 502 is moved according to the position information, which improves accuracy of the adsorbing process performed by the suction nozzle 502, avoids the adsorption force being insufficient or the suction nozzle 502 crushing the film or the first workpiece, improves the efficiency of the film removing process. Further, during the film removing process, the suction nozzle 502 can adsorb film that being soft or flexible, avoiding the bending and deformation of the film affecting the adsorbing process, and improving the reliability of the first processing device 500.

According to some embodiments, the assembling equipment 1000 includes a third attaching mechanism arranged at the third station. The third attaching mechanism is configured for picking up a third component and attaching the third component to the first workpiece that has been processed according to the first preset requirement.

In this embodiment, the first positioning assembly 201 and the second positioning assembly 202 are moved to the first station, the first attaching mechanism 300 at the first station can attach the first component to the first workpiece carried by the first position assembly 201, then the first positioning assembly 201 and the second positioning assembly 202 are moved to the second station, the first processing mechanism 500 at the second station processes the first workpiece that has been attached with the first component according to the first preset requirement. Then the first positioning assembly 201 and the second positioning assembly 202 are moved to the third station, the third attaching mechanism arranged at the third station attaches the third component to the first workpiece that has been processed according to the first preset requirement. Therefore, the third component is attached to the first component. For example, the first component includes a film and a glue layer, the first component is attached to the first workpiece by the glue layer, the film is attached to the glue layer at a side away from the first workpiece. The first preset requirement may be the first processing mechanism 500 at the second station removing the film, and the glue layer remains on the first workpiece. Then the third attaching mechanism attaches the third component to the first workpiece that has been processed according to the first preset requirement, that is, the third attaching mechanism attaches the third component to the glue layer on the first workpiece, then the third component is attached to the first workpiece by the glue layer.

According to some embodiments, the third mechanism includes a second transfer assembly and a third detection assembly, the second transfer assembly is configured for picking up the third component and moving the third component between a third position and a fourth position, the third component may be the first attaching member abovementioned. The second transfer assembly picks up the third component at the third position, and the second transfer assembly attaches the third component to the first workpiece or removes the third component from the first workpiece at the fourth position.

The third detection assembly is configured for detecting a pose of the first workpiece that has been processed according to the first preset requirement. The assembling equipment 1000 further includes a controller 900, the controller 900 is coupled to the second transfer assembly and the third detection assembly. The controller 900 is configured for controlling the second transfer assembly to adjust the pose of the third component or controlling the first positioning assembly 201 to adjust the pose of the first workpiece according to the pose detected by the third detection assembly, thus the second transfer assembly can attach the third component to the first workpiece.

Figure 13:
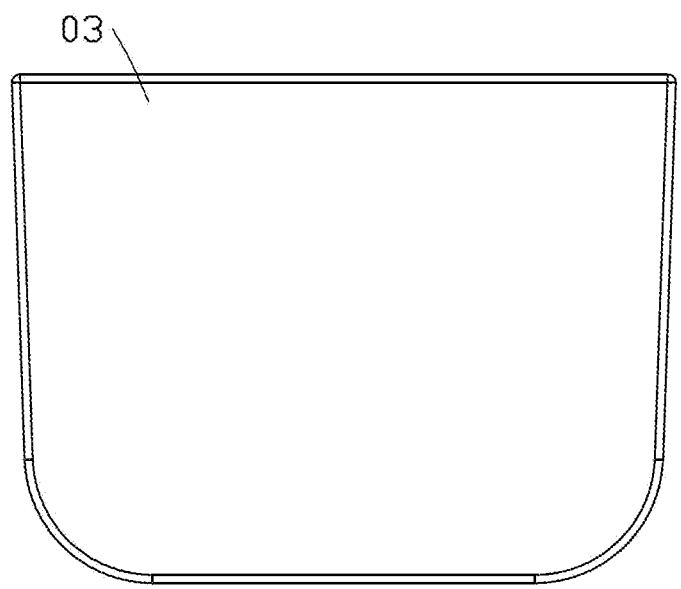
FIG. 13 is a front view of a fitting part according to an embodiment of the disclosure.
Figure 14:
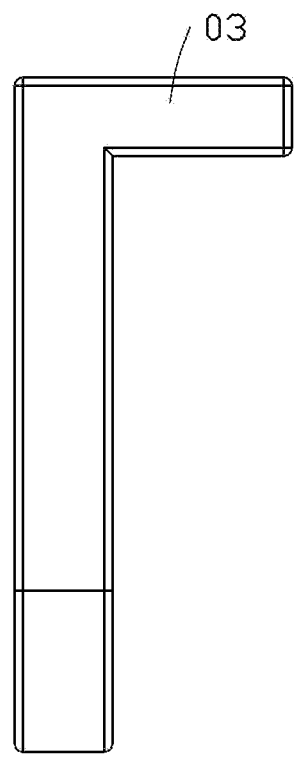
FIG. 14 is a side view of the fitting part in FIG. 13.
Figure 15:
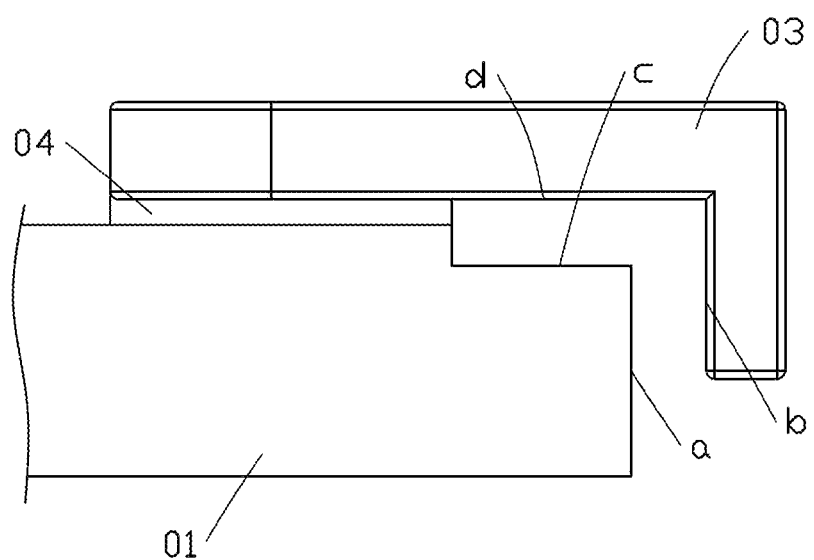
FIG. 15 shows a first workpiece that has been attached with a fitting part.

In this embodiment, the third component may be a precision part with a small size, such as the first attaching member above-mentioned, or any other suitable member. Referring to FIGS. 13-15, the third component is shown as a fitting part 03, the fitting part 03 is L-shaped. During the attaching process, a fourth surface d of the fitting part 03 is in contact with the first workpiece 01, a second surface b of the accessory 03 is parallel to a first surface a of the first workpiece 01, and a gap is defined between the second surface b of fitting part 03 and the first surface a of the first workpiece 01. The gap between the fourth d of fitting part 03 and the third surface c of the first workpiece 01 avoids a deflection of fitting in the process of attaching.

The third detection assembly may be a shooting member configured for acquiring an image of the first workpiece at the fourth position, and the third detection assembly can acquire a pose of the first workpiece according to the image. It should be noted that, the pose of the first workpiece refers to a position, an angle, and a shape of the first workpiece. In this embodiment, the pose of the first workpiece refers to the position of the first workpiece, the angle of the first workpiece relative to a plane, the shape and height of the first workpiece.

In operation, the first positioning assembly 201 and the second positioning assembly 202 arrived at the third station, the third detection assembly detects the pose of the first workpiece and sends the pose to the controller 900, the controller 900 controls the second transfer assembly to adjust the pose of the third component accordingly, or the controller 900 controls the first positioning assembly 201 to adjust the pose of the first workpiece accordingly, such that the third component carried by the second transfer assembly can be attached to the first workpiece correctly.

According to further embodiments, the third detection assembly includes a third photographing device and a fourth photographing device coupled with the controller 900. The third photographing device is arranged at a side of the attaching portion of the first workpiece away from the first positioning assembly 201. The third photographing device is configured for acquiring a first image of the third component and the attaching portion of the first workpiece at the fourth position. The fourth photographing device is arranged at a side of the attaching portion of the first workpiece near the first positioning assembly 201. The fourth photographing device is configured for acquiring a second image of the third component and the attaching portion of the first workpiece at the fourth position. The controller 900 controls the second transfer assembly to adjust the pose of the third component or controls the first positioning assembly 201 to adjust the pose of the first workpiece according to the first image and the second image.

It should be noted that, the third photographing device is arranged at a side of the attaching portion of the first workpiece away from the first positioning assembly 201, the fourth photographing device is arranged at a side of the attaching portion of the first workpiece near the first positioning assembly 201, in particular, when the attaching portion is located at a top surface of the first workpiece, the first workpiece is held on a top surface of the first positioning assembly 201, the third photographing device will be arranged at a side of the first workpiece near the attaching portion, and the fourth photographing device will be arranged at a side of the first workpiece near the first positioning assembly 201; when the attaching portion is located at a bottom surface of the first workpiece, the first workpiece is held on the top surface of the first positioning assembly 201, the third photographing device will be arranged at a side of the first workpiece near the first positioning assembly 201, and the fourth photographing device will be arranged at near the first workpiece. If a relative position of the first workpiece, the attaching portion, and the first positioning assembly 201 is changed, the position of the third photographing device and the fourth photographing device will be changed accordingly, and the third photographing device and the fourth photographing device will be arranged at both sides of the attaching portion respectively. One of the third photographing device and the fourth photographing device is configured for acquiring the first image of the attaching portion at the third position or the attaching portion and the third component at the third position from the side of the attaching portion, and the other one of the third photographing device and the fourth photographing device is configured for acquiring the second image of the attaching portion at the fourth position or the attaching portion and the third component at the fourth position from the other side of the attaching portion.

The third photographing device is configured for shooting the attaching portion or the attaching portion and the third component from above. Specifically, the third photographing device acquires an image, the image includes the third component and the attaching portion, and the position of the third component relative to the attaching portion can be acquired according to the first image of the third component and the attaching portion at the fourth position. Alternatively, the third photographing device is configured for shooting the attaching portion and the third component respectively, and the pose of the third component or the attaching portion can be adjusted by analyzing the first image of the third component and the attaching portion at the fourth position respectively.

Similarly, the fourth photographing device is configured for shooting the attaching portion or the attaching portion and the third component from bottom. Specifically, the fourth photographing device acquires an image, the image includes the third component and the attaching portion, and the position of the third component relative to the attaching portion can be acquired according to the second image of the third component and the attaching portion at the fourth position. Alternatively, the fourth photographing device is configured for shooting the attaching portion and the third component respectively, and the pose of the third component or the attaching portion can be adjusted by analyzing the second image of the third component and the attaching portion at the fourth position respectively.

The controller 900 controls the second transfer assembly to adjust the pose of the third component or controls the first positioning assembly 201 to adjust the pose of the first workpiece according to the first image and the second image. The process of adjusting the pose of the third component or the attaching portion includes adjusting a size of the third component protrudes from the first workpiece, an angle of attaching the third component to the first workpiece, and a position of attaching the third component to the first workpiece.

Referring to FIG. 15, according to some embodiments, the first workpiece is provided with an attaching part 04, the first attaching mechanism 300 includes a third transfer assembly 307 and a fourth detection assembly 330, the third transfer assembly 307 is configured for picking up the first component and moving the first component between a fifth position and a sixth position. The third transfer assembly 307 picks up the first component at the fifth position, and the third transfer assembly 307 attaches the first component to the first workpiece or removes the first component from the first workpiece at the sixth position. The fourth detection assembly 330 is configured for detecting a pose of the attaching part 04. The assembling equipment 1000 further includes a controller 900, the controller 900 is coupled to the third transfer assembly 307 and the fourth detection assembly 330. The controller 900 is configured for controlling the third transfer assembly 307 to adjust the pose of the first component or controlling the first positioning assembly 201 to adjust the pose of the attaching part 04 according to the pose of the attaching part 04, thus the third transfer assembly 307 can attach the first component to the attaching part 04.

In this embodiment, the attaching part 04 is provided on the first workpiece when the first positioning assembly 201 and the second positioning assembly 202 are moved to the first station. The attaching part 04 may be the glue layer exposed by removing the film. In addition, the first component in this embodiment can be same with the third component in foresaid embodiments, such as the fitting part 03 shown in FIGS. 13-15. In this embodiment, the first attaching mechanism 300 may be same with the third attaching mechanism in foresaid embodiments.

According to some embodiments, the third transfer assembly 307 is provided with a second suction nozzle 311 at an end of the third transfer assembly 307. The second suction nozzle 311 is configured for adsorbing the first component.

The fourth detection assembly 330 may be a photographing device, the photographing device is configured for capturing an image of the attaching part at the sixth position and acquiring the pose of the attaching part according to the image. The pose of the attaching part refers to a position, an angle, and a shape of the attaching part. In this embodiment, the pose of the attaching part refers to the position of the attaching part, the angle of the attaching part relative to a plane, and the shape and height of the attaching part.

Figure 11:
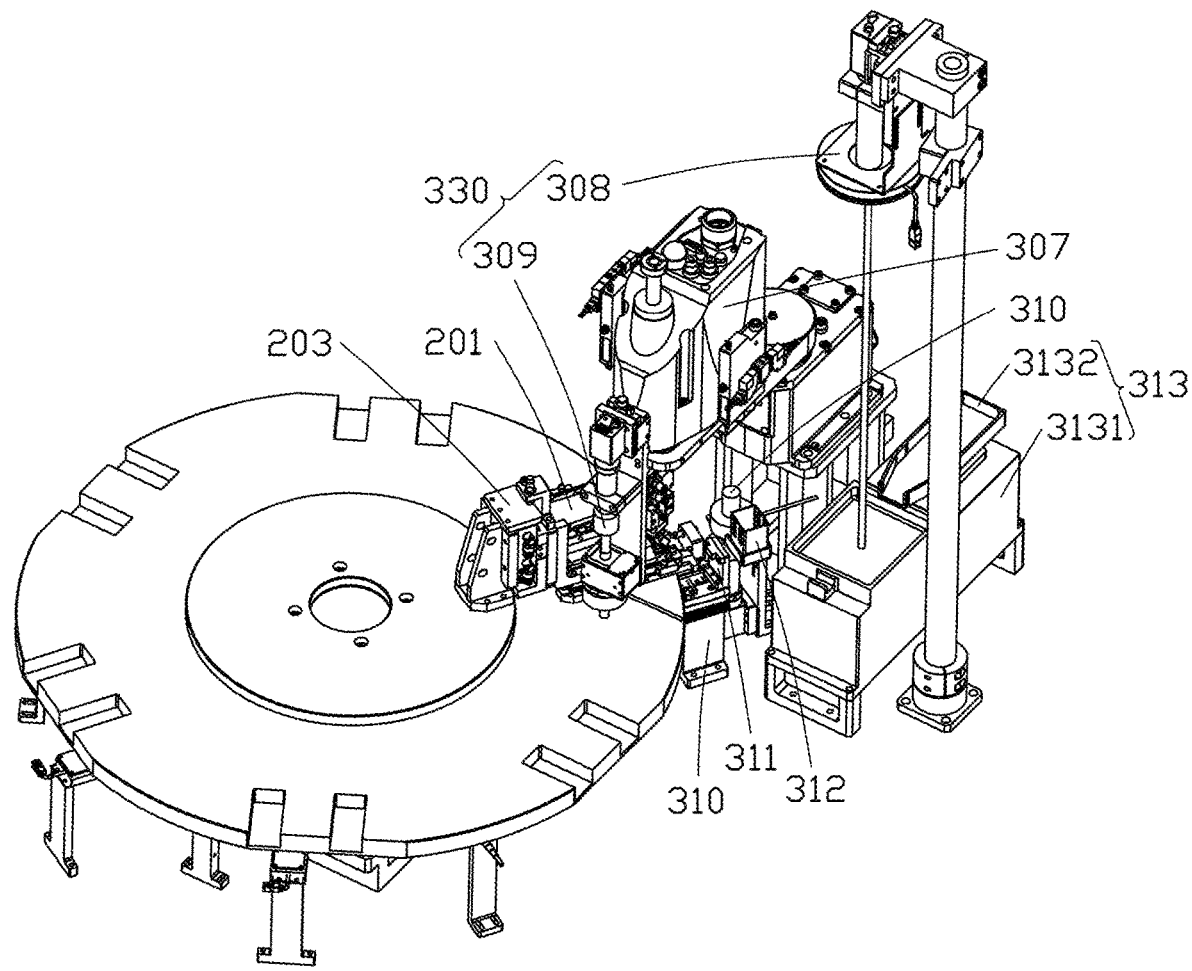
FIG. 11 is a perspective view of a first attaching mechanism in FIG. 2.

Referring to FIG. 11, according to some embodiments, the fourth detection assembly 330 includes a fifth photographing device 308 coupled to the controller 900. The fifth photographing device 308 is arranged on the third transfer assembly 307, and the fifth photographing device 308 faces the attaching part. The fifth photographing device 308 is configured for acquiring an image of the first component at the fifth position. The controller 900 controls the third transfer assembly 307 to pick up the first component according to the image of the first component at the fifth position.

Specifically, a second feeding assembly 313 vibrates and disperses the first components into a disorderly state, and the fifth photographing device 308 is used to obtain an image of the first component in the vibrating and dispersing state at the fifth position, and transmits the image to the control device 900. The control device 900 obtains the information of the position, shape, and pose of the first component that meets the requirements according to the image, and determines whether the first component is complete, and whether the position and pose meet the requirements. When the position and pose of the first component meet the preset requirements, the controllers 900 controls the third transfer assembly 307 to move to the fifth position to pick up the first component.

According to some embodiments, referring to FIG. 11, the second feeding assembly 313 is a vibration plate 313. The vibration plate 313 includes a vibrating member 3131 and a loading section 3132, and the fifth position is located in the loading section 3132. The vibrating member 3131 can vibrate the first component to the loading section 3132 to make the first component located in the fifth position, and by controlling the vibration of the vibrating member 3131, a plurality of the first components can be vibrated into a disorderly state and the plurality of first components can be located in the loading section 3132. The fifth photographing device 308 obtains image information of the plurality of first components in the loading section 3132, and the position of the first component that meets the requirement can be acquired according to the image information. Then the third transfer assembly 307 can be controlled to obtain the first component based on the position of the first component that meets the requirement.

Referring to FIG. 11, according to some embodiments, the fourth detection assembly 330 includes a sixth photographing device 309 coupled to the controller 900. The sixth photographing device 309 is arranged at a side of the attaching part away from the first positioning assembly 201, and the sixth photographing device 309 is configured for acquiring a third image of the first component and the attaching part at the sixth position. The controller 900 is configured for controlling the third transfer assembly 307 to adjust the pose of the first component or controlling the first positioning assembly 201 to adjust the pose of the attaching part according to the third image of the attaching part and the first component at the sixth position.

According to some embodiments, the fourth detection assembly 330 includes a seventh photographing device coupled to the controller 900. The seventh photographing device is arranged at a side of the attaching part near the first positioning assembly 201, and the seventh photographing device is configured for acquiring a fourth image of the first component and the attaching part at the sixth position. The controller 900 is configured for controlling the third transfer assembly 307 to adjust the pose of the first component or controlling the first positioning assembly 201 to adjust the pose of the attaching part according to the third image and the fourth image.

It should be noted that the arrangement of the sixth photographing device 309 and the seventh photographing device refers to the arrangement of the third photographing device and the fourth photographing device above. The sixth photographing device 309 acquires the third image in the same way as the third photographing device acquires the first image, and the seventh photographing device acquires the fourth image in the same way as the fourth photographing device acquires the second image, which will not be repeated here.

In this embodiment, the third transfer assembly 307 can be controlled to adjust the pose of the first component or the first positioning assembly 201 can be controlled to adjust the pose of the attaching part according to the third image of the first component and the attaching portion at the sixth position acquired by the sixth photographing device 309. Alternatively, the third transfer assembly 307 can be controlled to adjust the pose of the first component or the first positioning assembly 201 can be controlled to adjust the pose of the attaching part according to the third image acquired by the sixth photographing device 309 and the fourth image acquired by the seventh photographing device.

According to some embodiments, referring to FIG. 11, two sixth photographing devices 309 arranged. One of the two sixth photographing devices 309 is configured for obtaining a first image of the attaching part of the first workpiece at the second position, and the other is configured for obtaining a first image of the first workpiece at the second position.

Referring to FIG. 11, according to some embodiments, the first attaching mechanism 300 includes a second waste drum 312. After adjusting the pose of the first component, if the pose of the first component is unmatched with the attaching part, the first transfer assembly 301 moves the first component away from the first workpiece and puts the first component in the second waste drum 312.

Referring to FIG. 12, according to some embodiments, the assembling equipment 1000 further includes a limit plate 3101, a limit member 3102, a limit base 3104, and a movable member 3105. The limit plate 3101 is arranged at the first station, and the limit plate 3101 is located at a lateral side of the first positioning assembly 201 after the first positioning assembly 201 and the second positioning assembly 202 arrives at the first station. The limit member 3102 is connected to the limit plate 3101, and the limit member 3102 is extendable out of the limit plate 3101 or retractable into the limit plate 3101. The limit member 3102 is used to press against a side of the first component when the first attaching device 300 attaches the first component to the first workpiece. The limit plate 3101 is movably provided in the limit base 3104, and the limit base 3104 is provided with a projection to limit the travel of the limit plate 3101; the movable member 3105 is used to move the limit plate 3101 until the limit plate 3101 is against the projection.

According to some embodiments, referring to FIG. 11 and FIG. 12, the conveying mechanism 200 is provided with a lateral limit mechanism 310 at a lateral side. The lateral limit mechanism 310 is located on one side of the first positioning assembly 201 after the first positioning assembly 201 and the second positioning assembly 202 arrived at the first station. Referring to FIG. 12, the lateral limit mechanism 310 includes a limit plate 3101, a limit member 3102, a limit base 3104, and a movable member 3105. The limit member 3102 may be a push pin, and the push pin is extendable out of the limit plate 3101 or retractable into the limit plate 3101. The limit plate 3101 can slide relative to the limit base 3104, and the limit base 3104 is provided with a projection to limit the travel of the limit plate 3101. The movable member 3105 can move to push the limit plate 3101, the movable member 3105 pushes the limit plate 3101 to the projection until the limit plate 3101 is pressed against the projection. The assembling equipment 1000 further includes a restoring spring 3107, the restoring spring 3107 is used to restore the limit plate 3101. One end of the restoring spring 3107 is connected to the limit plate 3101, and the other end of the restoring spring 3107 is connected to the limit base 3104.

According to some embodiments, at least one of the first preset requirement, the second preset requirement, the third preset requirement, and the fourth preset requirement is pressing the first component that has been attached to the first workpiece against the first workpiece for a predetermined time duration. The first processing mechanism 500 includes at least one pressure retaining module, a first detection module, and a motion module. Each pressure retaining module includes a pressure retaining member and a lift driver, the pressure retaining member is used to retain a pressure of pressing the first component against the first workpiece. The lift driver is connected to the pressure retaining member, and the lift driver is used to adjust the position of the pressure retaining member along a first direction. A projection of detection assembly of the first detection module on a projection plane is not coincide with a projection of the pressure retaining member on the projection plane, the projection plane is perpendicular to the first direction. The pressure retaining module and the first detection module are both connected to the motion module, the motion module is used to move the pressure retaining module along a second direction to a position corresponding to the first workpiece and/or move the first detection module along the second direction to a position corresponding to the first workpiece, the second direction is not parallel to the first direction.

In operation, the pressure retaining module is used to retain the pressure of pressing the first component against the first workpiece, the first detection module is used to detect the attaching of the first component. The pressure retaining module and the first detection module are both connected to the motion module, then the motion module can move the pressure retaining module along the second direction to the position corresponding to the first workpiece, the lift driver moves the pressure retaining member along the first direction to press the first component against the first workpiece and provide a press retaining force on the first component, effecting the press retaining on the first component. Then the lift driver moves the pressure retaining member backward from the first workpiece. The motion module moves the first detection module along the second direction to the position corresponding to the first workpiece, and the first detection module detects the attaching of the first component.

In this embodiment, other than traditional manual retaining pressure module and microscope rechecking, the first processing mechanism 500 can realize the function of retaining pressure and rechecking after retaining pressure, which reduces the manpower demand and manpower cost. In addition, the pressure retaining module and the first detection module are integrated, the integrated structure is compact, the space occupation is relatively small, the time cost by the rechecking is short, and the efficiency is improved.

According to some embodiments, the first processing mechanism 500 further includes a second detection module connected to the motion module, the second detection module is located at a side of the motion module away from the first detection module. The motion module is used to move the second detection module along the second direction to a position corresponding to the first workpiece.

It should be noted that, the first detection module and the second detection module are located on both sides of the motion module respectively, such that the first workpiece can be detected from different directions, and different detection requirements can be satisfied. Further, the motion module can move the first detection module and the second detection module to both sides of the first workpiece respectively along the second direction, the first detection module and the second detection module can detect the first workpiece together, which improves the efficiency of detection.

It should be noted that, the second detection module is not necessary. The first workpiece can be moved, such that the first detection module can detect the first workpiece from different direction. Alternatively, The motion module can move the first detection module to different sides of the first workpiece to detect the first workpiece from different direction.

It should be noted that, in this embodiment, the structure of the second attaching mechanism 400 may be same as that of the first attaching mechanism, which will not be repeated here.

The assembling equipment 1000 provides the first positioning assembly and the second positioning assembly, the first positioning assembly and the second positioning assembly move together to transfer the first workpiece and the second workpiece between different stations at one time. The arrangement of two positioning assemblies transferring workpieces synchronously allows a compact structure and improves the working efficiency. The first attaching mechanism attaches the first component to the first workpiece at the first station, the second attaching mechanism attaches the second component to the second workpiece at the second station, which realizes an automatic attaching process, avoids manual operation, and reduces manual labor intensity and costs. Further, the automatic attaching process eliminates poor consistency due to manual operation, improves the product quality, and facilities production in large batches. The assembling equipment 1000 provides the asynchronous processing of the first workpiece and the second workpiece, that is, the attaching process is performed on the first workpiece and the second workpiece at different stations, and different processes are performed on the first workpiece and the second component at one station at the same time. Such arrangement is suitable for use especially with application scenarios of miniaturized assembling system, as two attaching mechanisms that would be the first attaching mechanism and the second attaching mechanism arranged at one station may interfere with each other when operating at the same time. Such arrangement makes full use of the equipment space and makes the structure more compact. In addition, such arrangement can realize the synchronous action of the second attaching mechanism and the first processing mechanism, avoiding the first workpiece carried by the first positioning assembly corresponding to the second positioning assembly to be idle when the attaching operation is performed on the second workpiece carried by the second positioning assembly, making the production rhythm more compact and improving the working efficiency.

While the invention has been described in detail with only a limited number of embodiments, it should be readily understood for the skilled in the art that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, and is only limited by the scope of the appended claims.

What is claimed is:

1. An assembling equipment comprising:
   a base comprising a first station and a second station;
   a conveying mechanism arranged on the base;
   a first positioning assembly and a second positioning assembly arranged on the conveying mechanism, the first positioning assembly being configured for positioning a first workpiece, and the second positioning assembly being configured for positioning a second workpiece, the conveying mechanism being configured to move the first positioning assembly and the second positioning assembly synchronously to the first station and move the first positioning assembly and the second positioning assembly synchronously from the first station to the second station;
   a first attaching mechanism arranged at the first station, the first attaching mechanism being configured for picking up and attaching a first component to the first workpiece carried by the first positioning assembly after the first positioning assembly and the second positioning assembly being moved to the first station;
   a second attaching mechanism arranged at the second station, the second attaching mechanism being configured for picking up and attaching a second component to the second workpiece carried by the second positioning assembly after the first positioning assembly and the second positioning assembly being moved from the first station to the second station; and
   a processing mechanism arranged at the second station, the processing mechanism being configured for processing the first workpiece that has been attached to the first component.

2. The assembling equipment of claim 1, wherein the first component comprises a first attaching member, the first attaching mechanism comprises:
   a first transfer assembly configured for picking up the first attaching member at a first position and moving the first attaching member from the first position to a second position to attach the first attaching member to the first workpiece, and the first transfer assembly is further configured for removing the first attaching member from the first workpiece; and
   a first detection assembly configured for detecting a pose of the first workpiece;
   the assembling equipment further comprises a controller, the controller is coupled to the first transfer assembly, the first detection assembly, and the first positioning assembly; the controller is configured for controlling the first transfer assembly to adjust the first attaching member according to the pose of the first workpiece, such that the first transfer assembly is positioned to move and attach the first attaching member to the first workpiece.

3. The assembling equipment of claim 2, wherein the first attaching mechanism further comprises:
   a first detection assembly configured for detecting a pose of the first workpiece;
   the assembling equipment further comprises a controller, the controller is coupled to the first transfer assembly, the first detection assembly, and the first positioning assembly; the controller is configured for controlling the first positioning assembly to adjust the first workpiece according to the pose of the first workpiece, such that the first transfer assembly is positioned to move and attach the first attaching member to the first workpiece.

4. The assembling equipment of claim 3, wherein
   the first detection assembly comprises a first photographing device coupled with the controller, the first photographing device is arranged on the first transfer assembly, and the first photographing device is configured for acquiring an image of the first attaching member at the first position;
   the controller controls the first transfer assembly to pick up the first attaching member according to the image of the first attaching member.

5. The assembling equipment of claim 3, wherein
   the first detection assembly further comprises a second photographing device coupled with the controller, the second photographing device is arranged on the first transfer assembly, and the second photographing device is configured for acquiring an image of the first attaching member and an attaching portion of the first workpiece at the second position;
   the controller controls the first transfer assembly to adjust a pose of the first attaching member according to the image of the first attaching member and the attaching portion of the first workpiece at the second position.

6. The assembling equipment of claim 5, wherein
   the controller further controls the first positioning assembly to adjust the pose of the first workpiece according to the image of the first attaching member and the attaching portion of the first workpiece at the second position.

7. The assembling equipment of claim 1, wherein
the processing mechanism removes a film of the first component from the first workpiece;
the processing mechanism comprises:
a detection assembly configured for acquiring position information of the film, the position information of the film comprising a height of the film or an attaching portion of the first workpiece;
a suction nozzle configured for sucking the film; and
a movable assembly connected to the suction nozzle, the movable assembly drives the suction nozzle to move towards or away from the first workpiece, such that the movable assembly moves the suction nozzle to adsorb the film to remove the film from the first workpiece.

8. The assembling equipment of claim 7, wherein
the assembling equipment further comprises a controller, the controller is coupled with the processing mechanism;
the controller is configured for controlling the movable assembly to move the suction nozzle according to the position information of the film, such that the suction nozzle is positioned to remove the film from the first workpiece.

9. The assembling equipment of claim 1, wherein the first attaching mechanism comprises:
a transfer assembly configured for picking up the first component at a first position and moving the first component from the first position to a second position to attach the first component to the first workpiece, and the transfer assembly further configured for removing the first component from the first workpiece;
a detection assembly configured for detecting a pose of an attaching part of the first component; and
a controller coupled to the transfer assembly and the detection assembly, the controller being configured for controlling the transfer assembly to adjust the first component according to a pose of the attaching part, such that the transfer assembly is positioned to attach the first component to the attaching part.

10. The assembling equipment of claim 9, wherein the controller is further configured for controlling the first positioning assembly to adjust the attaching part according to the pose of the attaching part, such that the transfer assembly is positioned to attach the first component to the attaching part.

11. The assembling equipment of claim 9, wherein the detection assembly comprises a photographing device coupled to the controller, the photographing device is arranged on the transfer assembly and faces the attaching part, the photographing device is configured for acquiring an image of the first component at the first position;
the controller is configured for controlling the transfer assembly to pick up the first component according to the image of the first component at the first position.

12. The assembling equipment of claim 9, wherein the detection assembly comprises a first photographing device coupled to the controller, the first photographing device is arranged at a side of the attaching part away from the first positioning assembly, and the first photographing device is configured for acquiring a first image of the first component and the attaching part at the second position;
the controller is configured for controlling the transfer assembly to adjust a pose of the first component or controlling the first positioning assembly to adjust the pose of the attaching part according to the first image of the attaching part and the first component at the second position.

13. The assembling equipment of claim 12, wherein the detection assembly further comprises a second photographing device coupled to the controller, the second photographing device is arranged at a side of the attaching part near the first positioning assembly, and the second photographing device is configured for acquiring a second image of the first component and the attaching part at the second position;
the controller is configured for controlling the transfer assembly to adjust the pose of the first component or controlling the first positioning assembly to adjust the pose of the attaching part according to the first image and the second image.

14. The assembling equipment of claim 1, further comprising:
a limit plate arranged at the first station, wherein the limit plate is located on a lateral side of the first positioning assembly after the first positioning assembly and the second positioning assembly are being moved to the first station;
a limit member connected to the limit plate, the limit member being extendable out of the limit plate or retractable into the limit plate, wherein the limit member is configured to press against a side of the first component when the first attaching device attaches the first component to the first workpiece;
a limit base movably provided in the limit base, and the limit base comprising a projection configured to limit a movement of the limit plate; and
a movable member configured to move the limit plate until the limit plate is against the projection.

15. An assembling equipment comprising:
a base comprising a first station, a second station, and a third station;
a conveying mechanism arranged on the base, the conveying mechanism comprising a first positioning assembly and a second positioning assembly, the conveying mechanism moves the first positioning assembly and the second positioning assembly synchronously to the first station, the second station, and the third station in sequence, the first positioning assembly is configured for carrying a first workpiece, and the second positioning assembly is configured for carrying a second workpiece;
a first attaching mechanism arranged at the first station, the first attaching mechanism picking up and attaching a first component to the first workpiece carried by the first positioning assembly after the first positioning assembly and the second positioning assembly being moved to the first station, the first component comprises a film and a glue layer attached to the film on one side of the film, the first component is attached to the first workpiece by the glue layer;
a first processing mechanism arranged at the second station, the first processing mechanism removing the film of the first component from the first workpiece carried by the first positioning assembly after the first positioning assembly and the second positioning assembly being moved from the second station to the third station, leaving the glue layer on the first workpiece;
another first attaching mechanism arranged at the third station, the another first attaching mechanism attaches a first accessory to the glue layer on the first workpiece carried by the first positioning assembly after the first positioning assembly and the second positioning assembly being moved to the third station.

16. The assembling equipment of claim 15, wherein:

the base further comprises a fourth station;

the assembling equipment further comprises:

a second attaching mechanism arranged at the second station, the second attaching mechanism picking up and attaching a second component to the second workpiece carried by the second positioning assembly after the first positioning assembly and the second positioning assembly being moved from the first station to the second station, the second component comprises a film and a glue layer attached to the film on one side of the film, the second component is attached to the second workpiece by the glue layer;

a second processing mechanism arranged at the third station, the second processing mechanism removing the film of the second component from the second workpiece carried by the second positioning assembly after the first positioning assembly and the second positioning assembly being moved from the second station to the third station, leaving the glue layer on the second component;

another second attaching mechanism arranged at the fourth station, the another second attaching mechanism attaches a second accessory to the glue layer on the second workpiece carried by the second positioning assembly after the first positioning assembly and the second positioning assembly being moved to the fourth station.

17. The assembling equipment of claim 16, wherein:

the base further comprises a fifth station;

the assembling equipment further comprising:

a third processing mechanism arranged at the fifth station, the third processing mechanism processes the first workpiece and the second workpiece synchronously after the first positioning assembly and the second positioning assembly being moved from the fourth station to the fifth station.

18. The assembling equipment of claim 17, wherein the third processing mechanism presses the first accessory and the second accessory against the first workpiece and the second workpiece respectively for a certain time duration.

\* \* \* \* \*